(12) United States Patent
Illikkal et al.

(10) Patent No.: US 7,185,147 B2
(45) Date of Patent: Feb. 27, 2007

(54) STRIPING ACROSS MULTIPLE CACHE LINES TO PREVENT FALSE SHARING (75) Inventors: Ramesh G. Illikkal, Portland, OR (US); Ram Huggahalli, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 10/735,113

(22) Filed: Dec. 12, 2003

(65) Prior Publication Data

US 2005/0132144 A1    Jun. 16, 2005

(51) Int. Cl.
*G06F 12/00* (2006.01)
(52) U.S. Cl. .................. 711/118; 711/130; 711/154; 711/157
(58) Field of Classification Search .............. None
See application file for complete search history.

(56) References Cited

U.S. PATENT DOCUMENTS

| 6,389,468 B1 * | 5/2002 | Muller et al. ............... 709/226 |
| 6,912,602 B2 * | 6/2005 | Sano et al. .................. 710/22 |
| 2002/0174252 A1 * | 11/2002 | Hayter et al. ............... 709/250 |

OTHER PUBLICATIONS

David A. Patterson and John L. Hennessy, Computer Architecture A Quantitative Approach, 1996, Morgan Kaufmann Publishers, Inc., Second Edition, pp. 431-438.*

* cited by examiner

*Primary Examiner*—Reginald Bragdon
*Assistant Examiner*—Shawn Gu
(74) *Attorney, Agent, or Firm*—Blakely, Sokoloff, Taylor & Zafman LLP (57) ABSTRACT A method and system for striping across multiple cache lines to prevent false sharing. A first descriptor to correspond to a first data block is created. The first descriptor is placed in a descriptor ring according to a striping policy to prevent false sharing of a cache line of the computer system.

16 Claims, 8 Drawing Sheets

STRIPING ACROSS MULTIPLE CACHE LINES TO PREVENT FALSE SHARING

BACKGROUND

1. Field of Invention

The field of invention relates generally to computer systems and, more specifically but not exclusively, relates to striping data across multiple cache lines to prevent false sharing.

2. Background Information

Computer systems typically include one or more I/O devices. I/O device drivers are used for communicating with I/O devices. Information is received and sent from an I/O device in the form of data blocks. For example, a network interface card (NIC) receives and sends data blocks in the form of packets.

Control information between an I/O device and its corresponding I/O device driver is encapsulated in descriptors. A descriptor points to a buffer in memory that stores a data block. Normally, the descriptors are stored sequentially in a ring buffer in memory.

Usually, the size of a descriptor is smaller than the size of a cache line. More than one descriptor can fit into a single cache line of a computer system. Thus, when a descriptor is loaded from memory into a cache line, other descriptors corresponding to other data blocks may also be loaded into the same cache line.

Multi-processor computer systems also use caching techniques. In a multic-processor system, a situation may occur in which each processor is working in a separate cache, rather than in the shared memory. Changes to a processor's local cache will be communicated to other processors to keep the data coherent. Generally, a cache coherency protocol (also referred to as cache consistency) ensures the data in a cache is accuarte and updated before the processor consumes it. The data in a cache line gets written to memory when a new memory area is loaded to that cache line. This is important for consistent operation of multiprocessor systems in which each CPU has a non-shared cache of a shared memory area.

In a multi-processor system, having multiple descriptors for different data blocks in a single cache line may lead to false sharing. Generally, false sharing occurs when multiple processors want access to information contained in a single cache line. System performance is degraded because a processor must wait for access to the cache line while another processor completes activity with the cache line. In multi-processor systems, a performance bottleneck can arise from unnecessary cache-cache transfers.

BRIEF DESCRIPTION OF THE DRAWINGS

The present invention is illustrated by way of example and not limitation in the accompanying figures.

DETAILED DESCRIPTION

Embodiments of a method and system for striping across multiple cache lines to prevent false sharing are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
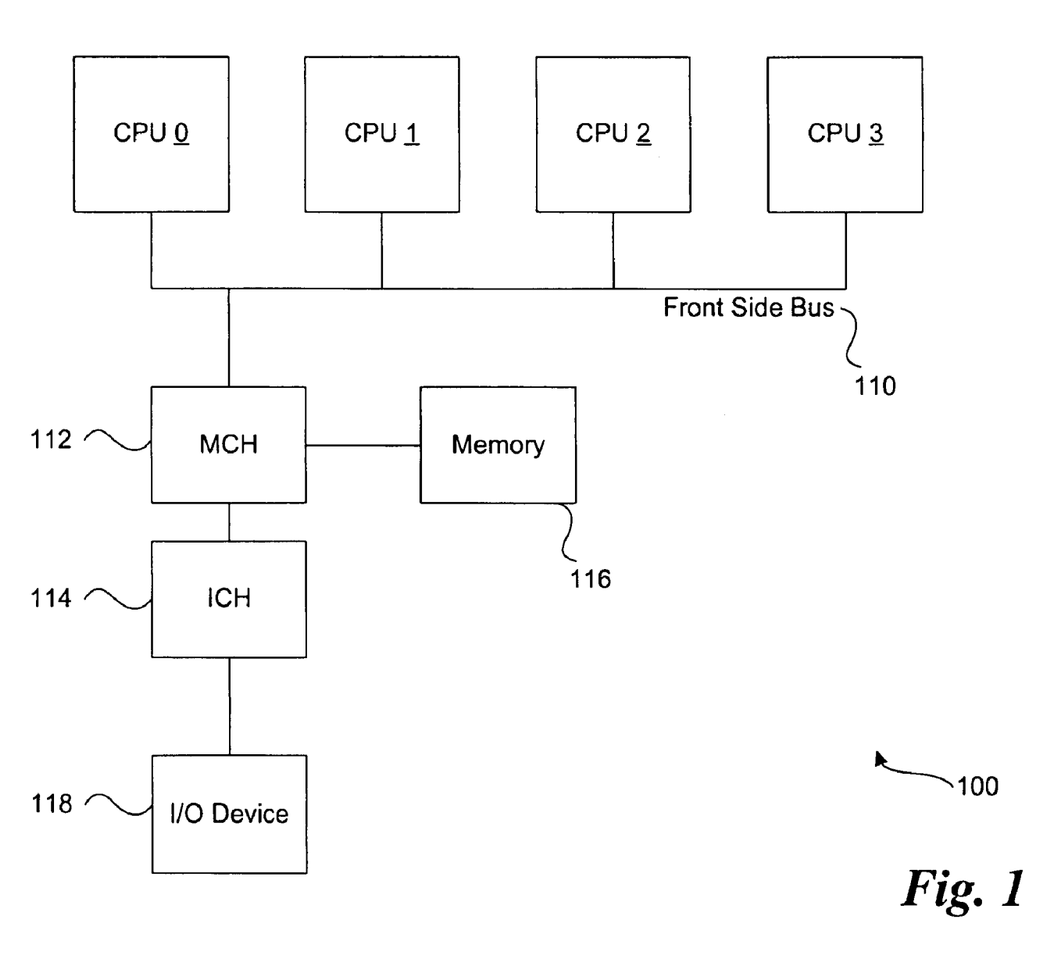
FIG. 1 is a schematic diagram illustrating one embodiment of a computer system to provide striping across multiple cache lines in accordance with the teachings of the present invention.

FIG. 1 illustrates an example computer system 100 for use with embodiments of the present invention. The computer system 100 is a shared memory multi-processor system. In one embodiment, computer system 100 is a web server having a plurality of network connections. CPUs 0, 1, 2, and 3 are each coupled to a front side bus 110. Also coupled to front side bus 110 is a memory control hub (MCH) 112. Coupled to MCH 112 is an I/O control hub (ICH) 114. In one embodiment, the MCH 112 and the ICH 114 may also be referred to as a chipset of the computer system. Coupled to the MCH 112 is memory 116. Coupled to ICH 114 is an I/O device 118. I/O device 118 includes, but is not limited to, a NIC, a storage device, such as a magnetic disk or an optical disk, or the like. In one embodiment, the I/O device 118 is integrated onto the motherboard of the computer system. It will be understood that embodiments of the present invention are not limited to CPUs but include any processor.

Figure 2:
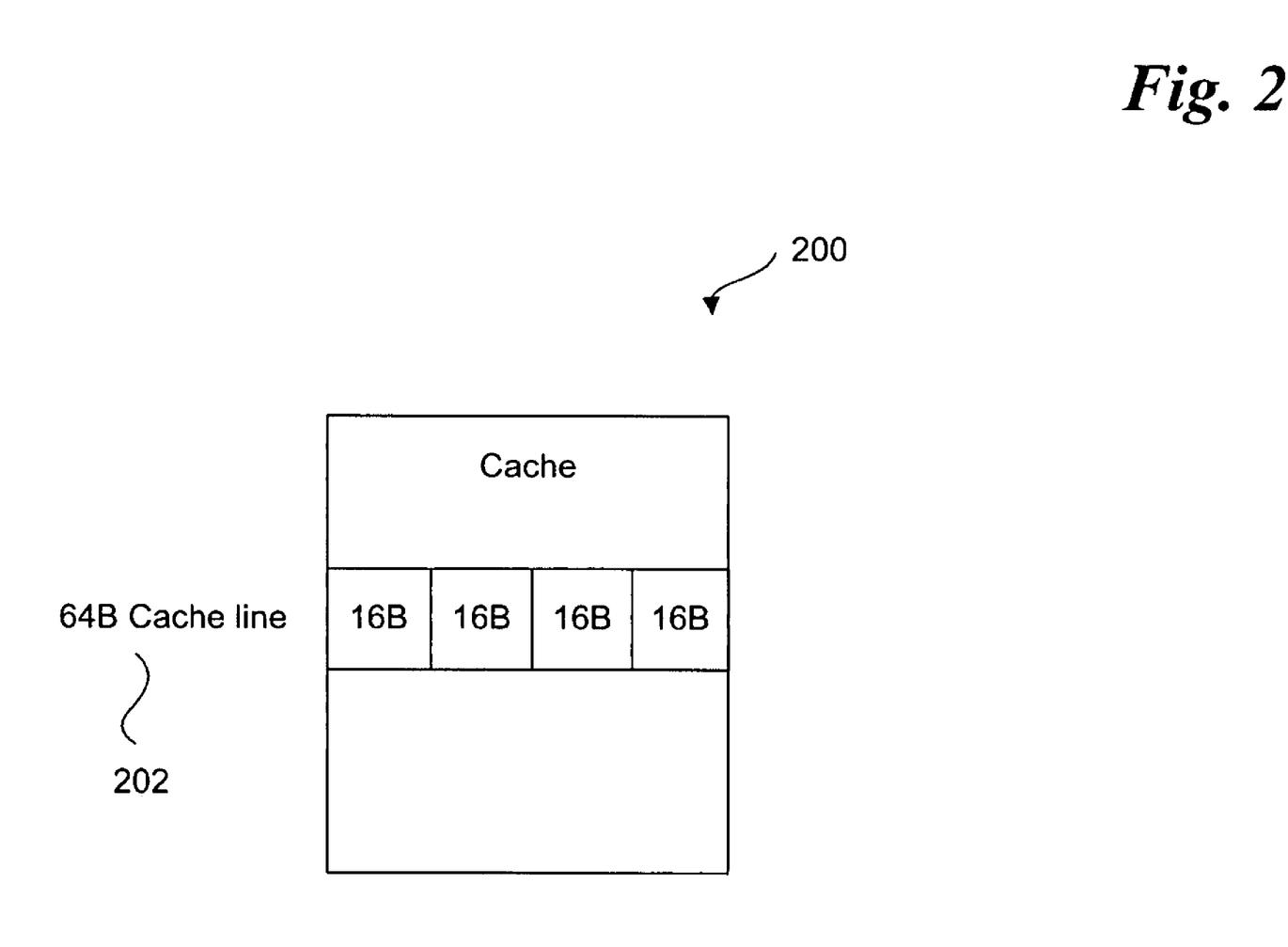
FIG. 2 is a schematic diagram illustrating one embodiment of a cache in accordance with the teachings of the present invention.

FIG. 2 illustrates a cache 200 according to an embodiment of the present invention. An example cache line 202 of cache 200 is shown. The cache line 202 is 64 bytes length and may hold up to 4 descriptors of 16 bytes each. Embodiments of the present invention may utilize one or more CPUs from the Intel® Pentium® 4 processor family in which the length of one cache line is 64 bytes.

Figure 3:
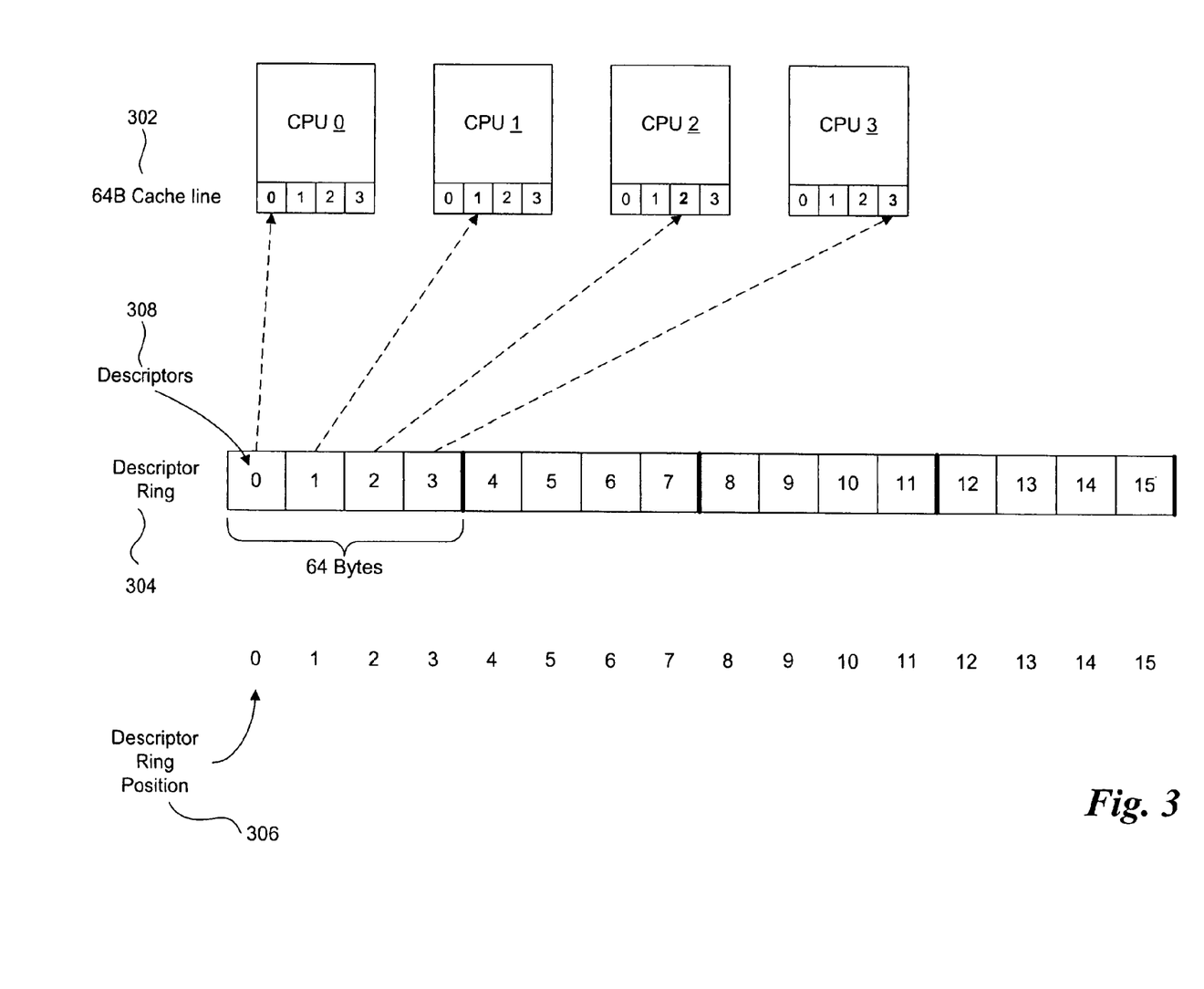
FIG. 3 is a schematic diagram illustrating one embodiment of a descriptor scheme in accordance with the teachings of the present invention.
Figure 4:
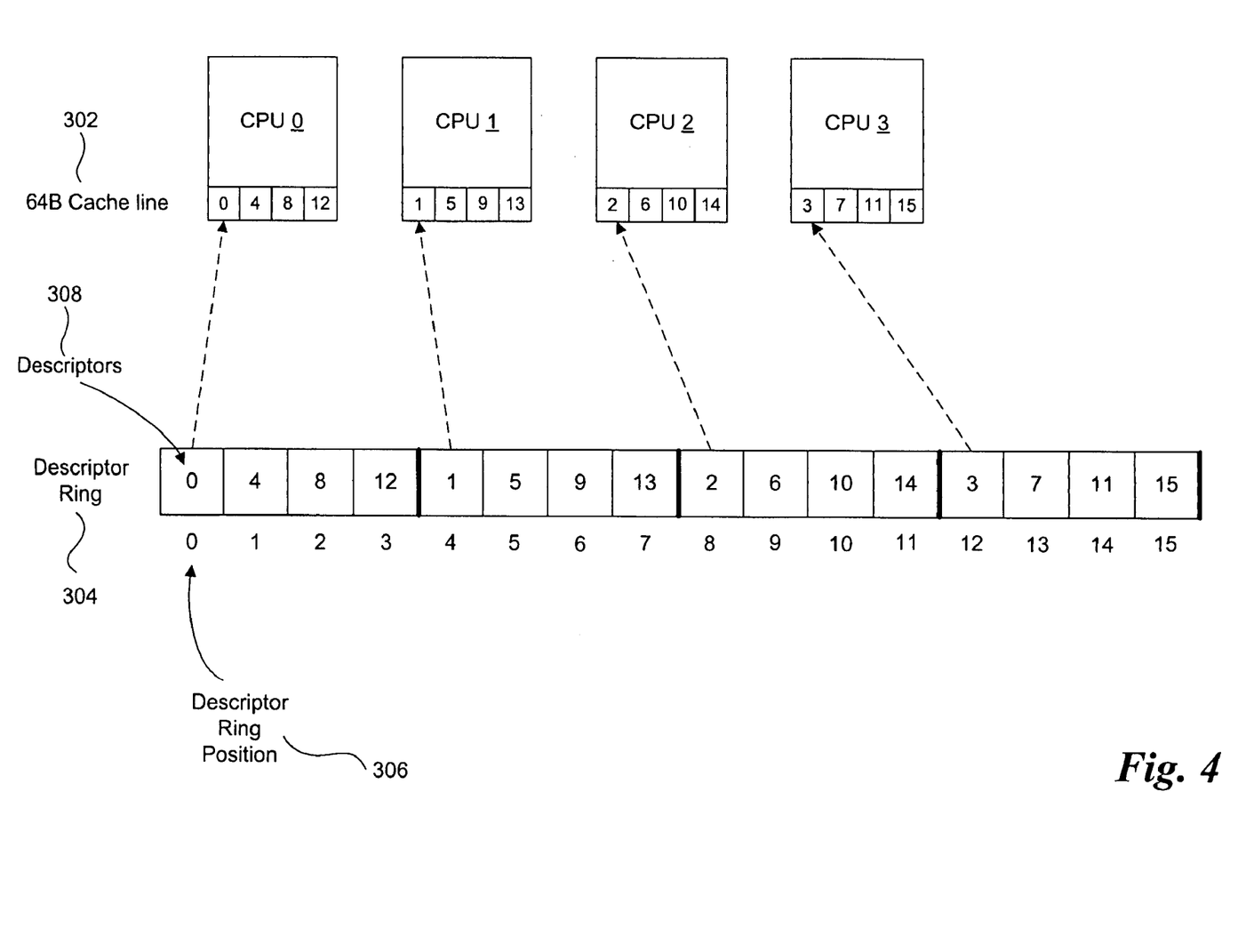
FIG. 4 is a schematic diagram illustrating one embodiment of striping across multiple cache lines in accordance with the teachings of the present invention.

FIG. 3 shows descriptors arranged sequentially in memory in a descriptor ring that leads to false sharing in a multi-processor system. FIG. 4 shows an embodiment of the present invention to stripe across multiple cache lines to prevent false sharing. The embodiments of FIGS. 3 and 4 will be described in terms of a NIC and a NIC device driver. However, it will be understood that embodiments of the present invention may be used with other types of I/O devices. Also, in the embodiments of FIGS. 3 and 4, one NIC is coupled to CPUs 0–3 for the sake of clarity, but it will be understood that embodiments of the present invention may include multiple NICs each communicatively coupled to CPUs 0–3.

FIG. 3 shows CPUs 0–3 and a cache line 302. Cache line 302 may be shared by the CPUs 0–3. A descriptor ring 304 is a ring buffer having descriptor ring positions 0–15, as shown at 306. 16 descriptors numbered 0–15, as shown at 308, are stored in descriptor ring positions 0–15, respectively. While descriptor ring 304 may store up to 16 descriptors, it will be understood that other embodiments may have more or less than 16 descriptor ring positions.

In the embodiment of FIG. 3, CPUs 0–3 are sending or receiving data on a NIC. When the NIC device driver executes on CPU 0, the driver reads descriptor 0 from memory. Since CPU 0 reads memory one cache line at a time, descriptors 1, 2 and 3 will also be read and put into a single cache line 302 because descriptors 0–3 are arranged sequentially in memory. Thus, when all 64 Bytes of the cache line are filled, descriptors 0–3 are read into the cache. When CPU 1 executes the NIC driver code, CPU 1 will try to send the next packet in the descriptor ring, which in FIG. 3 is descriptor 1. In one embodiment, a pointer to the descriptors is increased by one to get the next descriptor. In order to gain access to descriptor 1, CPU 1 needs to go through a cache coherency protocol.

The protocol will invalidate the cache in CPU 0 and provide ownership of the cache to CPU 1. This same cache coherency protocol occurs when CPU 2 accesses the descriptor 2 and CPU 3 accesses the descriptor 3. This false-sharing of a cache line increases latency and also front side bus/memory bandwidth requirements. Note that when CPU 1 requests the cache line containing descriptor 1, the cache line could have been marked modified by CPU 0 while CPU 0 was updating descriptor 0. This will in turn evict the cache line from CPU 0. If CPU 0 then needs to access descriptor 0, CPU 0 has to get descriptor 0 from CPU 1. This access of data on the same cache line by different CPUs creates cache thrashing and reduces performance.

FIG. 4 shows an embodiment of the invention to stripe the descriptor ring across multiple cache lines to prevent false sharing. In FIG. 4, the descriptors 308 are placed in the descriptor ring 304 according to a striping policy (discussed below.) When the descriptors in memory are read into the cache, descriptors sharing a single cache line will be descriptors 0, 4, 8, 12, or 1, 5, 9, 13, or 2, 6, 10, 14 or 3, 7, 11, 15. Thus, when CPU 0 is processing a packet corresponding to descriptor 0, another CPU may immediately request the next descriptor, in this case descriptor 1, without the cache coherency problem. In the same way, CPU 2 may process descriptor 2, and CPU 3 may process descriptor 3.

The placement of the descriptors in the descriptor ring may be made according to a striping policy. The placement of descriptors may take the size of the cache line into account. Thus, the descriptors are placed in the descriptor ring such that when a descriptor is requested by a first CPU, the next descriptor in the descriptor ring to be requested will not be in the cache line of the first CPU. In one embodiment, the striping policy may be managed by the NIC device driver.

It will be understood that the descriptors are accessed in logical sequence, that is descriptor 0, 1, 2, etc. However, in the embodiment of FIG. 4, a pointer to the descriptors will be increased by 4 instead of by 1 to reach the next descriptor in the descriptor ring. By using the pointer, the NIC device driver communicates the next valid descriptor available to the NIC. NIC hardware then fetches the descriptor pointed to by the pointer and then uses the descriptor to transfer data between the hardware and the device driver. In one embodiment, the NIC owns and moves a head pointer where the device driver owns and updates a tail pointer of the descriptor ring. By effectively managing these pointers, access to descriptors is made according to the striping policy.

In one embodiment, the assignment of a CPU to a particular descriptor may be tied to the position of the descriptor in the descriptor ring. If the descriptor ring position number of the descriptor is Descriptor_Position, and the total number of CPUs in the computer system is N, then the CPU assigned for that descriptor is as follows:

CPU Assignment=Descriptor_Position mod N.

For example, in the embodiment of FIG. 4, the number of CPUs is 4. The CPU assigned to the descriptor in descriptor ring position 5 is defined by 5 mod 4 which is 1. Thus, the descriptor in descriptor ring position 5 is to be processed by CPU 1. In another embodiment, a computer system has a CPU with multiple cores. In this instance, N will be the number of cores.

By stripping the descriptors across multiple cache lines, false sharing will be prevented. Also, cache bouncing will be reduced and thus reduce the descriptor access latency and front side bus bandwidth. This striping technique may be applied to I/O devices, such as NICs, hard disk drives, optical disk drives, or the like.

Figure 5:
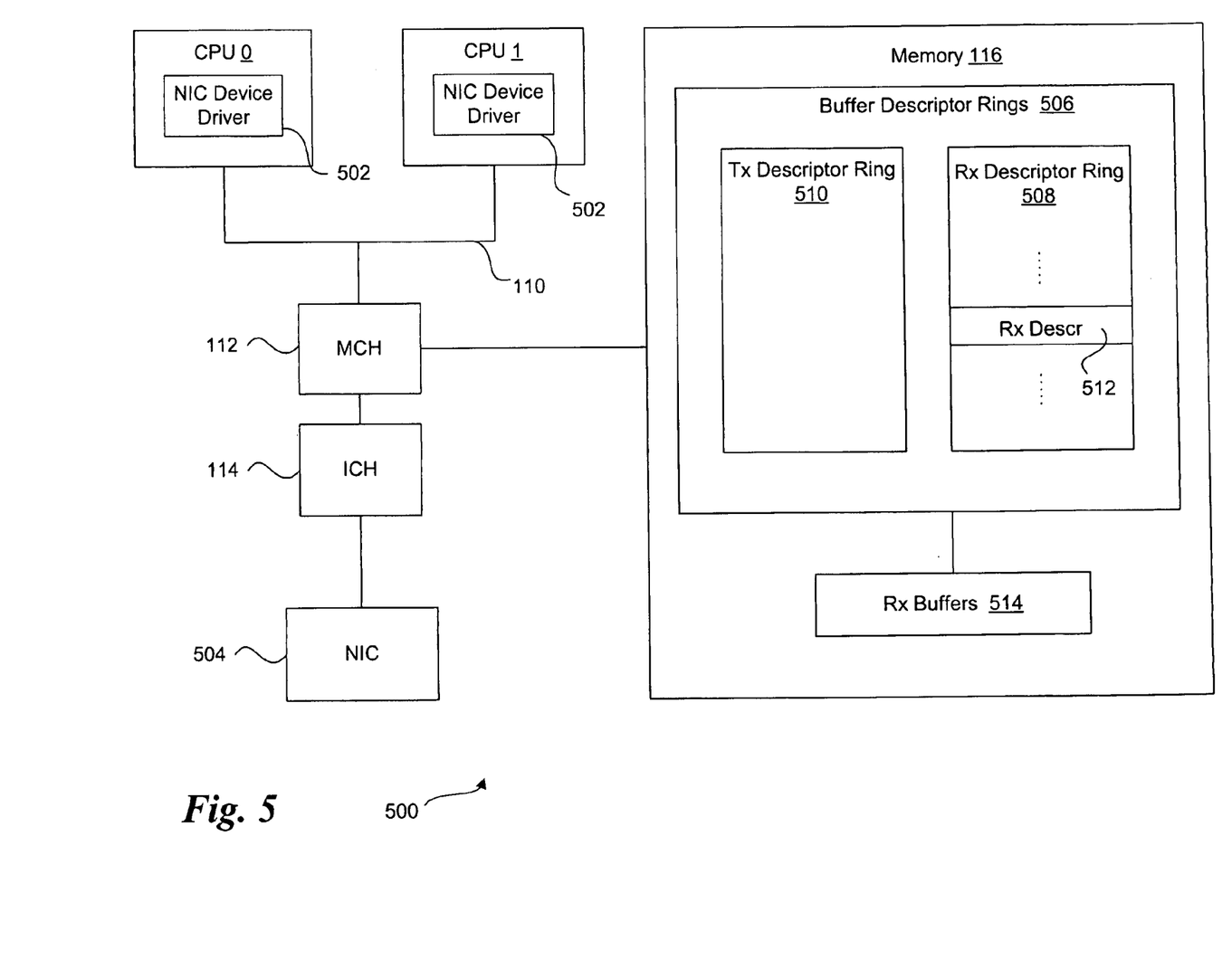
FIG. 5 is a schematic diagram illustrating one embodiment of a computer system to provide striping across multiple cache lines in accordance with the teachings of the present invention.

FIG. 5 shows an embodiment of the invention to provide striping across multiple cache lines. A computer system 500 includes CPU 0, CPU 1, and MCH 112 coupled to front side bus 110. ICH 114 and memory 116 are coupled to MCH 112. NIC 504 is coupled to ICH 114. A NIC device driver 502 is shown as executing on CPU 0 and CPU 1. In one embodiment, computer system 500 includes more than one NIC, each NIC communicatively coupled to CPU 0 and CPU 1.

Memory 116 includes buffer descriptor rings 506. The buffer descriptor rings 506 include a transmit descriptor ring 510 having transmit descriptors and a receive descriptor ring 508 having receive descriptors, such as receive descriptor 512. The transmit descriptors point to packets ready to be transmitted. The receive descriptors point to receive buffers 514. In one embodiment, the NIC device driver 502 manages a striping policy across multiple cache lines for the receive descriptor ring 508 and transmit descriptor ring 510.

Figure 6A:
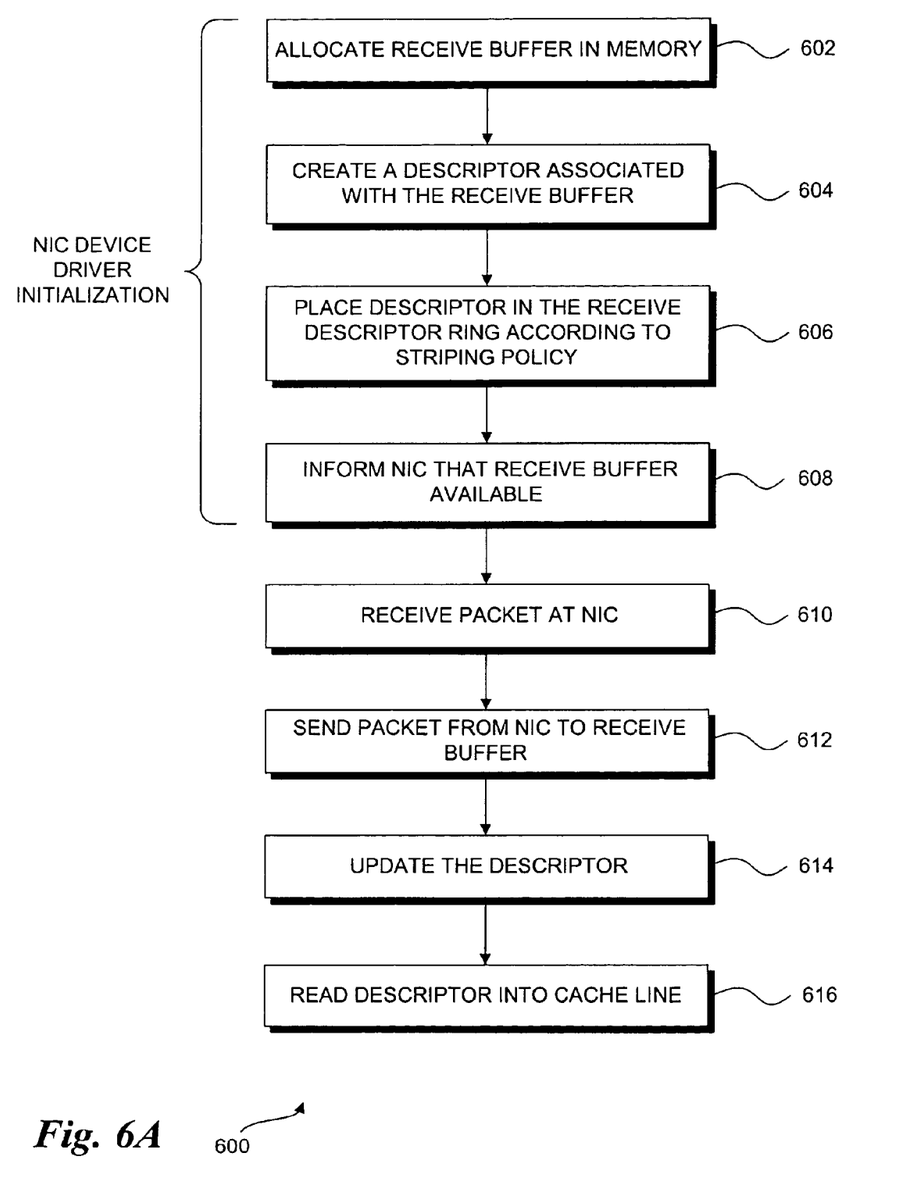
FIG. 6A is a flowchart illustrating one embodiment of the logic and operations for striping across multiple cache lines in accordance with the teachings of the present invention.
Figure 6B:
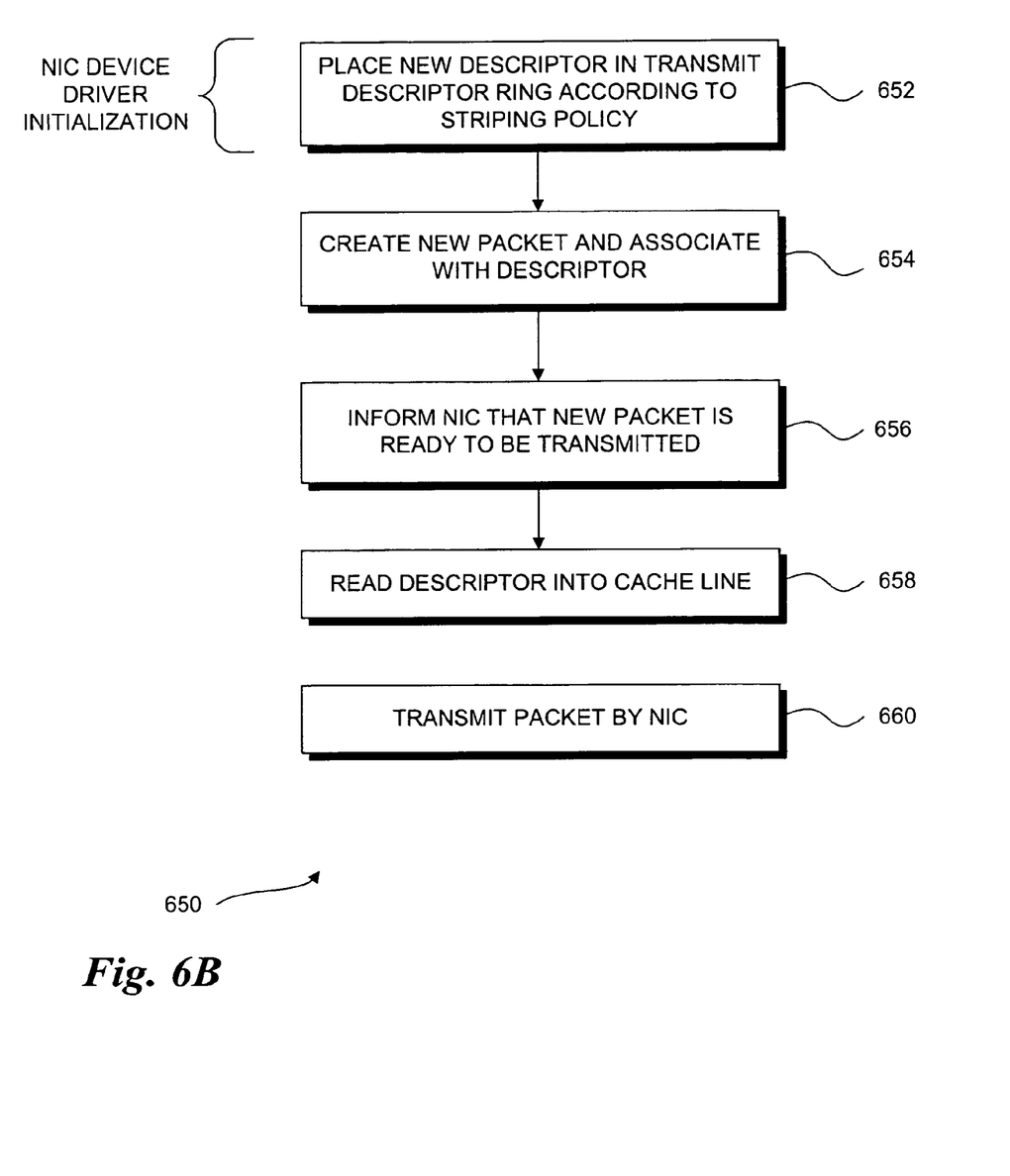
FIG. 6B is a flowchart illustrating one embodiment of the logic and operations for striping across multiple cache lines in accordance with the teachings of the present invention.

FIGS. 6A and 6B show embodiments of receiving and transmitting packets from a computer system that stripes data across multiple cache lines to prevent false sharing. FIG. 6A is an embodiment of receiving a packet at the computer system, and FIG. 6B is an embodiment of transmitting a packet from the computer system. While FIGS. 6A and 6B describe embodiments employing the TCP/IP (Transmission Control Protocol/Internet Protocol) networking protocol, it will be understood that embodiments of the present invention are not limited to TCP/IP.

FIG. 6A shows a flowchart 600 of one embodiment of the present invention to provide striping across multiple cache lines to receive packets. At a block 602, a NIC device driver allocates a receive buffer in memory for a packet. Proceeding to a block 604, the NIC device driver creates a descriptor associated with the receive buffer. In a block 606, the descriptor is placed in a receive descriptor ring according to a striping policy. The descriptor points to the receive buffer. In block 608, the NIC device driver informs the NIC that a receive buffer is available for a packet received at the NIC. In one embodiment, the availability of a receive buffer in memory is communicated by maintaining a head pointer and a tail pointer to the receive descriptor ring. In another embodiment, the events of blocks 602, 604, 606, and 608 occur at the NIC device driver initialization. In a block 610, a packet is received at the NIC of the computer system. The NIC then sends the packet to the receive buffer, as depicted in a block 612. In one embodiment, the NIC uses Direct Memory Access (DMA) to transfer the packet to memory. In a block 614, the NIC updates the descriptor to reflect the status of the receive buffer.

In one embodiment, an interrupt is generated to let the NIC device driver running on the CPU know about the received packet. If there are multiple CPUs, then the interrupt gets delivered to one of the CPUs and the driver code gets invoked, and it schedules a Deferred Procedure Call (DPC) or a software interrupt request (IRQ.) Most of the NIC driver code runs in the DPC context.

Proceeding to a block 616, the NIC device driver reads the NIC descriptor into a cache line to get packet header and payload information. Once the descriptor is read into the cache, the TCP/IP stack has access to the receive buffer containing the header and payload data. Since the descriptors in the receive descriptor ring have been striped across cache lines, a second CPU may process another packet associated with the next descriptor in the receive descriptor ring without slowdowns from false sharing of the cache line.

FIG. 6B shows a flowchart 650 of one embodiment of the present invention to provide striping across multiple cache lines to transmit packets. Starting in a block 652, a new descriptor is placed in a transmit descriptor ring according to a striping policy. In one embodiment, block 652 occurs at initialization of the NIC device driver. At block 654, a new packet is created at the computer system and the descriptor is associated with the new packet. The new packet is to be transmitted by the computer system. The logic proceeds to a block 656 where a NIC of the computer system is informed that the new packet is ready to be transmitted. In one embodiment, the tail pointer to the transmit descriptor ring is updated by the NIC device driver to inform the NIC that a new packet is ready. Continuing in a block 658, the descriptor for the packet to be transmitted is read into a cache line for processing by a CPU. The striping of the descriptors allows a second CPU to process the next packet for transmission without false sharing of a cache line. At a block 660, the new packet is transmitted by the NIC. In one embodiment, when the NIC completes the processing of a descriptor, the head pointer to the transmit descriptor ring is updated.

Figure 7:
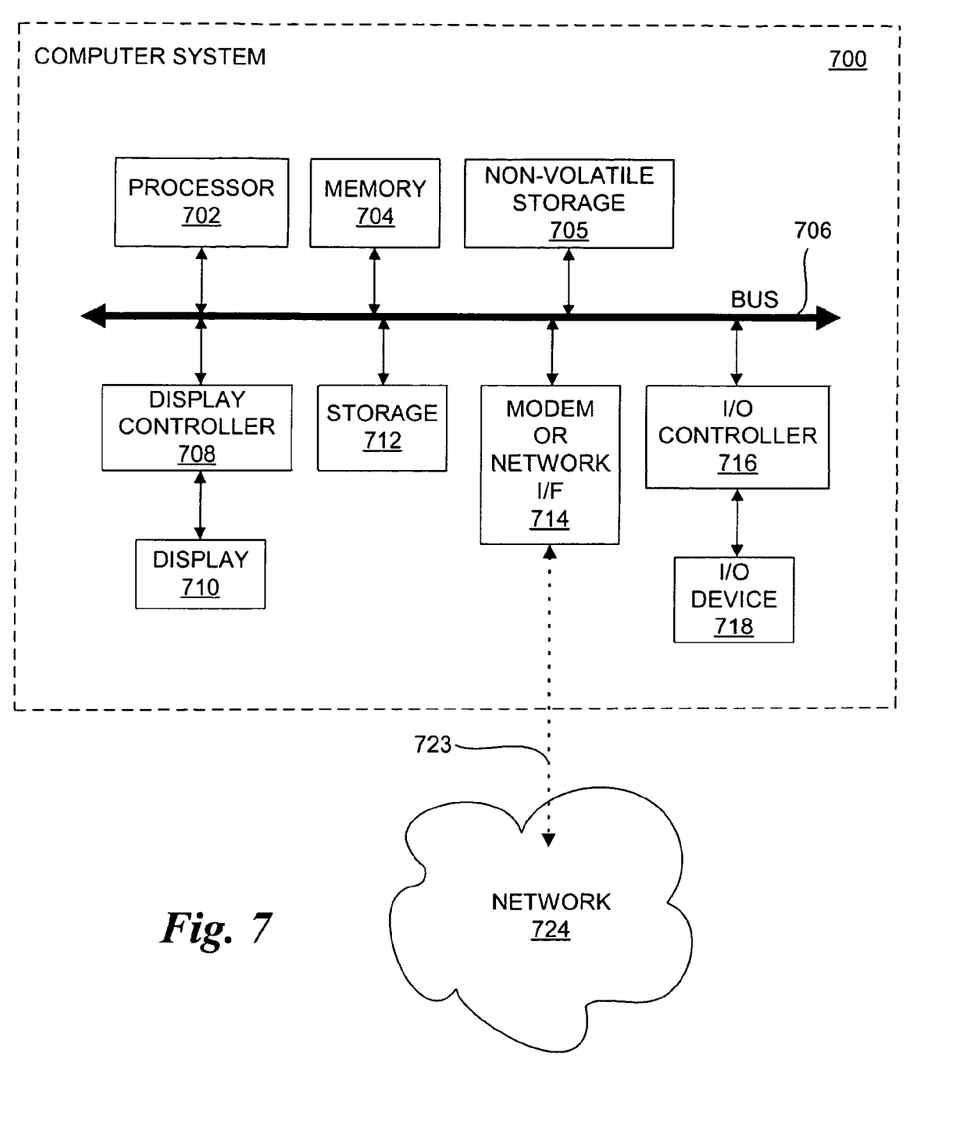
FIG. 7 is a schematic diagram illustrating one embodiment of a computer system in accordance with the teachings of the present invention.

FIG. 7 is an illustration of one embodiment of an example computer system 700 on which embodiments of the present invention may be implemented. In one embodiment, computer system 700 is a web server having a plurality of central processing units. Computer system 700 includes a processor 702 coupled to a bus 706. Memory 704, storage 712, non-volatile storage 705, display controller 708, input/output controller 716 and modem or network interface 714 are also coupled to bus 706. The computer system 700 interfaces to external systems through the modem or network interface 714. This interface 714 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 723 is received/transmitted by modem or network interface 714 to communicate with computer system 700. In the embodiment illustrated in FIG. 7, carrier waive signal 723 is used to interface computer system 700 with a computer network 724, such as a local area network (LAN), wide area network (WAN), or the Internet. In one embodiment, computer network 724 is further coupled to a remote computer (not shown), such that computer system 700 and the remote computer can communicate.

Processor 702 may be a conventional microprocessor including, but not limited to, an Intel Corporation x86, Pentium®, or Itanium® family microprocessor, a Motorola family microprocessor, or the like. Memory 704 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 708 controls in a conventional manner a display 710, which in one embodiment may be a cathode ray tube (CRT), a liquid crystal display (LCD), an active matrix display, or the like. An input/output device 718 coupled to input/output controller 716 may be a keyboard, disk drive, printer, scanner and other input and output devices, including a mouse, trackball, trackpad, joystick, or other pointing device.

The computer system 700 also includes non-volatile storage 705 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 712 in one embodiment may be a magnetic hard disk, an optical disk, or another form of storage for large amounts of data. Some data may be written by a direct memory access process into memory 704 during execution of software in computer system 700. It is appreciated that software may reside in storage 712, memory 704, non-volatile storage 705 or may be transmitted or received via modem or network interface 714.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.). In addition, a machine-readable medium can include propagated signals such as electrical, optical, acoustical or other form of propagated signals (e.g., carrier waves, infrared signals, digital signals, etc.).

It will be appreciated that computer system 700 is one example of many possible computer systems that have different architectures. For example, computer systems that utilize the Microsoft Windows® operating system in combination with Intel microprocessors often have multiple buses, one of which may be considered a peripheral bus. Workstation computers may also be considered as computer systems that may be used with the present invention. Workstation computers may not include a hard disk or other mass storage, and the executable programs are loaded from a corded or wireless network connection into memory 704 for execution by processor 702. In addition, handheld or palmtop computers, which are sometimes referred to as personal digital assistants (PDAs), may also be considered as computer systems that may be used with the present invention. As with workstation computers, handheld computers may not include a hard disk or other mass storage, and the executable programs are loaded from a corded or wireless network connection into memory 704 for execution by processor 702. A typical computer system will usually include at least a processor 702, memory 704, and a bus 706 coupling memory 704 to processor 702.

It will also be appreciated that in one embodiment, computer system 700 is controlled by operating system software. For example, one embodiment of the present invention utilizes Microsoft Windows® as the operating system for computer system 700. In other embodiments, other operating systems that may also be used with computer system 700 include, but are not limited to, the Apple Macintosh operating system, the Linux operating system, the Microsoft Windows CE® operating system, the Unix operating system, the 3Com Palm operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
    creating a first descriptor to correspond to a first data block; and
    placing the first descriptor in a descriptor ring according to a striping policy to prevent false sharing of a cache line between a plurality of processors of a computer system, wherein the striping policy assigns a first processor of the plurality of processors to the first descriptor according the following relationship:

Processor Assignment =Descriptor_Position mod N, where Descriptor_Position is a descriptor ring position of the first descriptor and N is a total number of the plurality of processors.

2. The method of claim 1 wherein the striping policy comprises placing the first descriptor in the descriptor ring such that the first descriptor and a second descriptor in the descriptor ring do not share the cache line when the second descriptor is requested, wherein the first descriptor to be the next descriptor requested from the descriptor ring after the second descriptor.

3. The method of claim 1 wherein the cache line is longer than the first descriptor.

4. The method of claim 3 wherein the cache line is 64 bytes long and the first descriptor is 16 bytes long.

5. The method of claim 1 further comprising receiving the first data block at an I/O device of the computer system from external to the computer system.

6. The method of claim 1 wherein the first data block is prepared at the computer system to be sent to an I/O device of the computer system.

7. An article of manufacture comprising:
    a recordable machine-readable medium including a plurality of instructions which when executed perform operations comprising:
    allocating a first receive buffer at a computer system including a plurality of processors, the first receive buffer to store a first packet received at a network interface card (NIC) of the computer system;
    creating a first descriptor corresponding to the first receive buffer; and
    placing the first descriptor in a descriptor ring according to a striping policy to prevent false sharing between the plurality of processors of a cache line of the computer system, wherein the striping policy assigns a first processor of the plurality of processors to the first descriptor according the following relationship:

Processor Assignment =Descriptor_Position mod N, where Descriptor_Position is a descriptor ring position of the first descriptor and N is a total number of the plurality of processors.

8. The article of manufacture of claim 7 wherein the striping policy comprises placing the first descriptor in the descriptor ring such that the first descriptor and a second descriptor in the descriptor ring do not share the cache line when the second descriptor is requested, the first descriptor to be the next descriptor requested from the descriptor ring after the second descriptor.

9. The article of manufacture of claim 7 wherein the plurality of instructions are embodied in a NIC device driver associated with the NIC.

10. A article of manufacture comprising:
    a recordable machine-readable medium including a plurality of instructions which when executed perform operations comprising:
    creating a first descriptor at a computer system including a plurality of processors, the first descriptor to correspond to a first packet to be transmitted by a network interface card (NIC) of the computer system; and
    placing the first descriptor in a descriptor ring according to a striping policy to prevent false sharing of a cache line between the plurality of processors of the computer system, wherein the striping policy assigns a first processor of the plurality of processors to the first descriptor according the following relationship:

Processor Assignment =Descriptor_Position mod N, where Descriptor_Position is a descriptor ring position of the first descriptor and N is a total number of the plurality of processors.

11. The article of manufacture of claim 10 wherein the striping policy comprises placing the first descriptor in the descriptor ring wherein the first descriptor and a second descriptor in the descriptor ring to not share the cache line when the second descriptor is requested, the first descriptor to be the next descriptor requested from the descriptor ring after the second descriptor.

12. The article of manufacture of claim 10 wherein the plurality of instructions are embodied in a NIC device driver associated with the NIC.

13. A computer system, comprising:
    a plurality of network interface cards (NICs);

a plurality of processors, each of the plurality of processors communicatively coupled to each of the plurality of NICs; and a storage device operatively coupled to the plurality of processors, the storage device including a plurality of instructions which when executed by a processor of the plurality of processors perform operations comprising:

creating a first descriptor to correspond to a first packet; and placing the first descriptor in a descriptor ring according to a striping policy to prevent false sharing of a cache line between the plurality of processors of the computer system, wherein the striping policy assigns a first processor of the plurality of processors to the first descriptor according the following relationship:

Processor Assignment=Descriptor_Position mod N, where Descriptor_Position is a descriptor ring position of the first descriptor and N is a total number of the plurality of processors.

14. The computer system of claim 13 wherein the striping policy comprises placing the first descriptor in the descriptor ring wherein the first descriptor and a second descriptor in the descriptor ring to not share the cache line when the second descriptor is requested, the first descriptor to be the next descriptor requested from the descriptor ring after the second descriptor.

15. The computer system of claim 13 wherein execution of the plurality of instructions further perform operations comprising receiving the first packet at a NIC of the plurality of NICs.

16. The computer system of claim 13 wherein execution of the plurality of instructions further perform operations comprising preparing the first packet at the computer system, the first packet to be transmitted from a NIC of the plurality of NICs.

* * * * *